United States Patent
Park et al.

(10) Patent No.: US 10,860,559 B2
(45) Date of Patent: Dec. 8, 2020

(54) COMPUTER DEVICE FOR PROVIDING TREE INDEX

(71) Applicant: TmaxData Co., Ltd., Gyeonggi-do (KR)

(72) Inventors: Sang Young Park, Gyeonggi-do (KR); Jae Seok An, Gyeonggi-do (KR); In Gyu Kang, Gyeonggi-do (KR)

(73) Assignee: TMAXDATA CO., LTD., Gyeonggi-do (KR)

( * ) Notice: Subject to any disclaimer, the term of this patent is extended or adjusted under 35 U.S.C. 154(b) by 278 days.

(21) Appl. No.: 15/472,820

(22) Filed: Mar. 29, 2017

(65) Prior Publication Data

US 2018/0268010 A1    Sep. 20, 2018

(30) Foreign Application Priority Data

Mar. 20, 2017  (KR) .................. 10-2017-0034552

(51) Int. Cl.
  *G06F 16/22* (2019.01)
  *G06F 16/21* (2019.01)
  *G06F 16/2455* (2019.01)

(52) U.S. Cl.
  CPC ........ *G06F 16/2246* (2019.01); *G06F 16/211* (2019.01); *G06F 16/24562* (2019.01)

(58) Field of Classification Search
  CPC ...................................................... G06F 17/30
  See application file for complete search history.

(56) References Cited

U.S. PATENT DOCUMENTS

| 4,823,310 A | * | 4/1989 | Grand ............... G06F 17/30327 |
| 6,792,432 B1 | * | 9/2004 | Kodavalla ......... G06F 17/30348 |
| 8,495,609 B2 | | 7/2013 | Troan |
| 2002/0087564 A1 | | 7/2002 | Khanna et al. |

(Continued)

FOREIGN PATENT DOCUMENTS

| JP | 2004326404 | 11/2004 |
| KR | 1020100053406 | 6/2010 |

OTHER PUBLICATIONS

Office Action issued by the Korean Patent Office (KIPO) dated Aug. 21, 2018 for Korean Application No. 10-2017-0034552. (Korean only).

*Primary Examiner* — Hau H Hoang
(74) *Attorney, Agent, or Firm* — Martin & Ferraro, LLP (57) ABSTRACT

Disclosed is a computer program stored in a computer readable storage medium, which includes encoded commands, in which when the computer program is executed by one or more processors of a computer system, the computer program allows the one or more processor to perform the following steps for indexing. The steps may include: deciding that a first leaf node is split in a tree index data structure including a parent node including one or more indexes, and the first leaf node and a second leaf node which are leaf nodes linked with the parent node through a pointer; generating a 1-$2^{nd}$ leaf node which is a next node of the first leaf node; storing in the 1-$2^{nd}$ leaf node an index to be split among indexes stored in the first leaf node; and linking the 1-$2^{nd}$ leaf node and the second leaf node to the pointer.

8 Claims, 8 Drawing Sheets

(56) References Cited

U.S. PATENT DOCUMENTS

| | | | |
|---|---|---|---|
| 2013/0185271 A1* | 7/2013 | Strain | G06F 16/2343 |
| | | | 707/704 |
| 2013/0204902 A1* | 8/2013 | Wang | G06F 17/30327 |
| | | | 707/797 |
| 2016/0314153 A1* | 10/2016 | Murata | G06F 12/06 |

* cited by examiner

Fig. 4

COMPUTER DEVICE FOR PROVIDING TREE INDEX

CROSS-REFERENCE TO RELATED APPLICATIONS

This application claims priority to and the benefit of Korean Patent Application No. 10-2017-0034552 filed in the Korean Intellectual Property Office on Mar. 20, 2017, the entire contents of which are incorporated herein by reference.

TECHNICAL FIELD

The present disclosure relates to an index, and more particularly, to an index of a tree structure.

BACKGROUND ART

A tree structure as a kind of a graph is constituted by a node and a pointer indicating the node. Multiple nodes may not indicate one node and one node may indicate multiple nodes. When a large quantity of stored data need to be searched, a scheme that compares the data one by one is inefficient. When the data are stored in an arrangement state through indexing using the tree structure, the data may be efficiently searched.

A B-tree in the tree structure is a tree structure in which the maximum number of child nodes which one node may possess is larger than 2 unlike a binary tree structure having a maximum of two child nodes. In the B-tree, the number of child nodes of each node is maximized, and as a result, the depth of the tree decreases. In this case, it is efficient that a node access time is longer than an operation time in the node.

A traverse means a series of processes of searching the index. The traverse is performed by a process of finding a next pointer by comparing a value of a search target and a division value by starting from a root node. When the index corresponding to the value of the search target is discovered through the traverse, the traverse ends. When the traverse is performed without being interrupted prematurely, a time of discovering the index of the search target may be shortened. Therefore, development of an index data structure having small interruption or delay at the time of performing the traverse is required in the art.

Prior Art Document: Japanese Patent Unexamined Publication No. JP2004326404

SUMMARY OF THE INVENTION

The present disclosure has been made in an effort to provide an indexing technique.

An exemplary embodiment of the present disclosure provides a computer program stored in a computer readable storage medium, which includes encoded commands. When the computer program is executed by one or more processors of a computer system, which allows the one or more processor to perform the following steps for indexing, the steps may include: deciding that a first leaf node is split in a tree index data structure including a parent node including one or more indexes, and the first leaf node and a second leaf node which are leaf nodes linked with the parent node through a pointer: generating a $1\text{-}2^{nd}$ leaf node which is a next node of the first leaf node storing in the $1\text{-}2^{nd}$ leaf node an index to be split among indexes stored in the first leaf node; and linking the $1\text{-}2^{nd}$ leaf node and the second leaf node to the pointer.

Alternatively, the linking of the $1\text{-}2^{nd}$ leaf node and the second leaf node to the pointer may include setting a lock in the $1\text{-}2^{nd}$ leaf node, adding the pointer of the second leaf node to the $1\text{-}2^{nd}$ leaf node, and releasing the lock of the $1\text{-}2^{nd}$ leaf node.

Alternatively, the steps may further include linking the parent node and the $1\text{-}2^{nd}$ leaf node to the pointer.

Alternatively, the linking of the parent node and the $1\text{-}2^{nd}$ leaf node to the pointer may include setting the lock in the parent node, adding the pointer of the $1\text{-}2^{nd}$ leaf node to the parent node, and releasing the lock of the parent node.

Alternatively, the steps may further include deleting an index duplicated to the $1\text{-}2^{nd}$ leaf node from the first leaf node; and linking the first leaf node and the $1\text{-}2^{nd}$ leaf node to the pointer.

Alternatively, the linking of the first leaf node and the $1\text{-}2^{nd}$ leaf node to the pointer may include setting the lock in the first leaf node, adding the pointer of the $1\text{-}2^{nd}$ leaf node to the first leaf node, and releasing the lock of the first leaf node.

Alternatively, the lock may be a spin lock.

Alternatively, at least one of the parent node, the first leaf node, the second leaf node, and the $1\text{-}2^{nd}$ leaf node may include a time stamp representing a time when each node is modified.

Alternatively, each of the parent node, the first leaf node, the second leaf node, and the $1\text{-}2^{nd}$ leaf node may include one or more indexes, and the respective indexes may consecutively disposed in the respective nodes and index consecutive data.

Alternatively, the parent node, the first leaf node, the second leaf node, and the $1\text{-}2^{nd}$ leaf node may be positioned in a main memory and have the same size and when the node is modified, the node may be modified in an atomic operation scheme.

Alternatively, the steps may further include: searching the first leaf node and the second leaf node linked to the parent node through the pointer at the time of performing the traverse; verifying whether the lock is set in the searched first leaf node or second leaf node; and continuously performing the traverse when the lock is not set in the verified node or waiting for the performing of the traverse until the lock is released or performing the traverse in a root node or the parent node again when the lock is set in the verified node.

Alternatively, the steps may further include: searching the first leaf node and the second leaf node linked to the parent node through the pointer at the time of performing the traverse; verifying the time stamp of the searched first leaf node or second leaf node; and continuously performing the traverse when the verified time stamp value of the node is less than a predetermined value or performing the traverse in the parent node again when the verified time stamp value of the node is equal to or more than the predetermined value.

Another exemplary embodiment of the present disclosure provides a method for indexing performed by one or more processors of a computer device. The method may include: deciding that a first leaf node is split in a tree index data structure including a parent node including one or more indexes, and the first leaf node and a second leaf node which are leaf nodes linked with the parent node through a pointer; generating a $1\text{-}2^{nd}$ leaf node which is a next node of the first leaf node; storing in the $1\text{-}2^{nd}$ leaf node an index to be split among indexes stored in the first leaf node; and linking the 1-2$^{nd}$ leaf node and the second leaf node to the pointer.

Still another exemplary embodiment of the present disclosure provides a computer device. The computer device may include: one or more processors; and a memory storing commands executable in the one or more processors, wherein the one or more processors decide that a first leaf node is split in a tree index data structure including a parent node including one or more indexes, and the first leaf node and a second leaf node which are leaf nodes linked with the parent node through a pointer, generate a 1-2$^{nd}$ leaf node which is a next node of the first leaf node, store in the 1-2$^{nd}$ leaf node an index to be split among indexes stored in the first leaf node, and link the 1-2$^{nd}$ leaf node and the second leaf node to the pointer.

According to an exemplary embodiment of the present disclosure, indexing can be efficiently performed.

BRIEF DESCRIPTION OF THE DRAWINGS

Some of embodiments are illustrated in the accompanying drawings so as to appreciate features of the mentioned disclosed contents with reference to the following exemplary embodiments through detailed and more concrete description. Further, it is intended that like reference numerals in the drawing denote the same or similar function throughout several aspects. However, the accompanying drawings just illustrate only specific typical exemplary embodiments of the disclosed contents and are not considered to limit the scope of the present disclosure and it should be noted that other exemplary embodiments having the same effect can be sufficiently recognized.

DETAILED DESCRIPTION

Various exemplary embodiments will be now described with reference to drawings. In the present specification, various descriptions are presented to provide appreciation of the present disclosure. However, it is apparent that the exemplary embodiments can be executed without the specific description. In other examples, known structures and apparatuses are presented in a block diagram form in order to facilitate description of the exemplary embodiments.

"Component", "module", "system", and the like which are terms used in the specification designate a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computer device and the computer device may be the components. One or more components may reside in the processor and/or execution thread and one component may be localized in one computer or distributed among two or more computers. Further, the components may be executed by various computer-readable media having various data structures, which are stored therein. The components may perform communication through local and/or remote processing according to a signal (for example, data through other system and a network such as the Internet through data and/or a signal from one component that interacts with other components in a local system and a distribution system) having one or more data packets, for example.

The word "comprises" and/or "comprising" means that the corresponding feature and/or component is present, but it should be appreciated that presence or inclusion of one or more other features, components, and/or a group thereof is not excluded. Further, when not separately specified or not clear in terms of the context by indicating a singular form, it should be construed that the singular generally means "one or more" in the present specification and the claims.

The terms "information" and "data" used in the specification may also be often used to be exchanged with each other.

The objects and effects of the present disclosure and technical components of accomplishing these will become obvious with reference to embodiments to be described below in detail along with the accompanying drawings. In describing the present disclosure, detailed description of known function or constitutions will be omitted if they unnecessarily make the gist of the present disclosure unclear. In addition, terms to be described below as terms which are defined in consideration of functions in the present disclosure may vary depending on the intention or usual practice of a user or an operator.

However, the present disclosure is not limited to exemplary embodiments disclosed below but may be implemented in various different forms. However, the exemplary embodiments are provided to make the present disclosure be complete and completely announce the scope of the present disclosure to those skilled in the art to which the present disclosure belongs and the present disclosure is just defined by the scope of the claims. Accordingly, the terms need to be defined base on contents throughout this specification.

Figure 1:
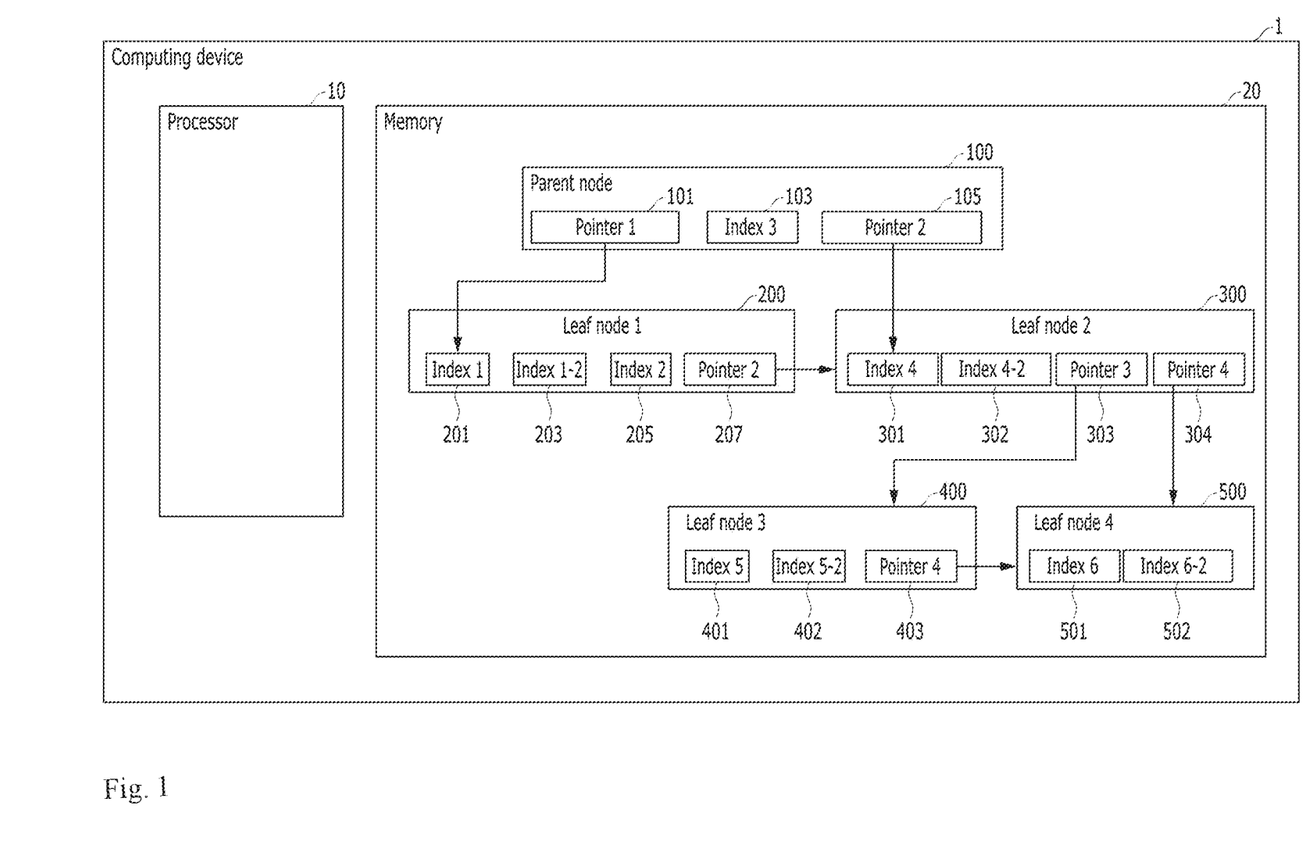
FIG. 1 is a block diagram illustrating configurations of a computer device in which indexing is performed according to an exemplary embodiment of the present disclosure.

FIG. 1 is a block diagram illustrating configurations of a computer device in which indexing is performed according to an exemplary embodiment of the present disclosure.

According to the exemplary embodiment of the present disclosure, a computer device 1 may include a processor 10 and a memory 20. The processor 10 may process all commands of the computer device 1. The processor 10 may generate a node, set a lock in the node, store an index, process commands linking pointers, and decide a node split in an index data structure. Further, the processor 10 may access data by referring to the index. The processor 10 may verify a condition of each node and perform an operation based on the condition at the time of performing the traverse. The condition may represent whether an index number of a search target is included in a range of the index number included in the node.

The memory 20 may store a tree index data structure. The tree index data structure may include a parent node 100, a first leaf node 200, a second leaf node 300, a third leaf node 400, and a fourth leaf node 500. The parent node 100 may include pointer 1 101, index 3 103, and pointer 2 105. Further, the first leaf node 200 may include index 1 201, index 1-2 203 index 2 205, and pointer 2 207. The second leaf node 300 may include index 4 301, index 4-2 302, index 3 303, and pointer 4 304. The third leaf node 400 may include index 5 401, index 5-2 402, and pointer 4 403. The fourth leaf node 500 may include index 6 501 and index 6-2 502. The index 1-2 may be an index of indexing next data of the index 1. The index 4-2 may be an index of indexing the next data of the index 4. The node included in the memory is not limited to the nodes and the index and the pointer are just set for easy description and the index and the pointer are not limited to a name and a number which are set and may exist in the node. The node, the index, and the pointer are just an example and the present disclosure is not limited thereto. Respective nodes may include the index and the pointer. The parent node 100 may include the pointers linked to the first lead node 200 and the second leaf node 300, respectively. Further, the second leaf node 300 may include the pointers linked to the third leaf node 400 and the fourth leaf node 500, respectively. The index may be a data index. The data index may include an address on the memory or an address on a permanent storage device (not illustrated) at which data is positioned. When the data are consecutively recorded, a search speed may be high. However, since the data are frequently updated in the memory or the permanent storage device in real time, it may be difficult to arrange and dispose the data in real time. Therefore, when the indexes are arranged in order and consecutively disposed, a data search time may be shortened. In the present disclosure, since the indexes are physically disposed in the memory in order, the data may be searched within a short time even though actual data are not arranged.

According to the exemplary embodiment of the present disclosure, the pointer may include a node pointer and an index pointer. Pointer 2 207, pointer 3 303, and pointer 4 304 may be the node pointers. Further, pointer 1 101 and pointer 2 105 may be the index pointers. The node pointer may be the pointer indicating another node linked with the node. The node pointer is included in the parent node to indicate the leaf node. The index pointer may be the pointer indicating the index included in another node. The processor 10 may search the node or the index linked to the pointer in performing the traverse.

The processor 10 may search the index according to the tree index data structure and search the data linked with the index. When the tree index data structure is used, the node may be searched and the index may be rapidly searched according to the condition. The pointer may indicate the node or the index in the data structure and announce a search direction. Further, the leaf node may be connected to the pointer as a lower node of the parent node.

According to the exemplary embodiment of the present disclosure, the processor 10 may determine the split of the node. When the data is added, the index may be additionally generated. When the data is generated, the index may also be additionally generated. When the index is added, the index may be added to the node.

The node may be configured as a block (e.g., 8 kbits) on the memory and when the index is added, a capacity of the node may be insufficient. The size of the node may be 8 kbits, but the present disclosure is not limited to the size of the node. When the index is additionally generated while the size of the node is full, the node may be decided to be split. Therefore, when the capacity of the node is insufficient in the case where the index is additionally generated, the node may be decided to be split. When the node is split, the split node may be linked by the pointer of another node. In the case where the index is added, only when the processor 10 needs to be added based on an index number, the node of the index may be decided. The data may not be arranged in the memory 20 or the permanent storage device (not illustrated) in order, but the indexes may be disposed in an order of the index number. The index may be stored per node.

According to the exemplary embodiment of the present disclosure, the leaf node may be a node having a larger depth than the parent node 100. When the node is split, the depth of the split node may be larger than the depth of the node which is not split. When the traverse is performed in the tree index structure, the processor 10 may search the node and the index in a direction in which the depth of the node increases. The respective leaf nodes liked by the respective pointers of one node may have the same depth. The first leaf node and the second leaf node linked to the respective pointers may have the same depth in the parent node. Further, the third leaf node and the fourth leaf node linked to the respective pointers may have the same depth in the second leaf node. For example, the depth of the parent node may be level 3 and the depths of the first leaf node and the second leaf node may be level 4. Further, the depths of the third leaf node and the fourth leaf node may be level 5. The depths of the parent node and the leaf node are just an example and the present disclosure is not limited thereto. The tree index structure disclosed in FIG. 1 has a total 3-level depth, but the present disclosure is not limited thereto and the tree index structure disclosed in FIG. 1 may include a tree index structure having a depth at a predetermined level.

FIGS. 2A to 2E are exemplary diagrams illustrating a node split step according to an exemplary embodiment of the present disclosure.

Figure 2A:
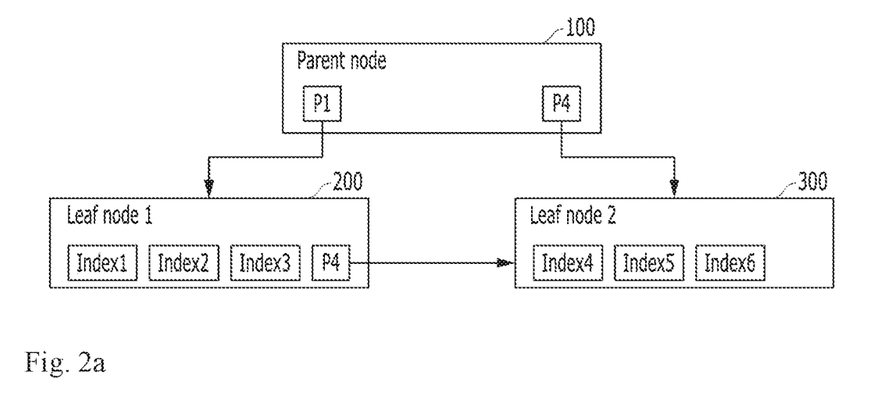
FIGS. 2A to 2E are exemplary diagrams illustrating a node split step according to an exemplary embodiment of the present disclosure.

FIG. 2A is an exemplary diagram illustrating the configurations of the parent node and the leaf node before the node is split according to the exemplary embodiment of the present disclosure.

According to the exemplary embodiment of the present disclosure, the tree index data structure may include the parent node, the first leaf node, and the second leaf node including one or more indexes. The first leaf node and the second leaf node may be linked with the parent node through the pointer. In the parent node 100, the index may be deleted and only the pointer indicating the leaf node including the deleted index may remain. The parent node 100 may include pointers P1 and P4. The first leaf node 200 may include an index 1, an index 2, an index 3, and the pointer P4. The second leaf node 300 may include an index 4, an index 5, and an index 6. The pointer P1 may be included in the parent node and linked to the first leaf node. Further, the pointer P4 may be included in the parent node and the first leaf node and linked to the second leaf node. The indexes included in the first leaf node and the second leaf node may be disposed in the order of index numbers. Therefore, the pointer P4 may be included in the first leaf node to link the second leaf node so that index numbers from 1 to 6 are sequentially disposed. For the depth of the node, the depth of the leaf node may be larger than that of the leaf node. Herein, the processor 10 may search the first leaf node 200 through the pointer P1 in the parent node 100 and search the second leaf node 300 through the pointer P4 in the parent node 100 at the time of performing the traverse.

Figure 2B:
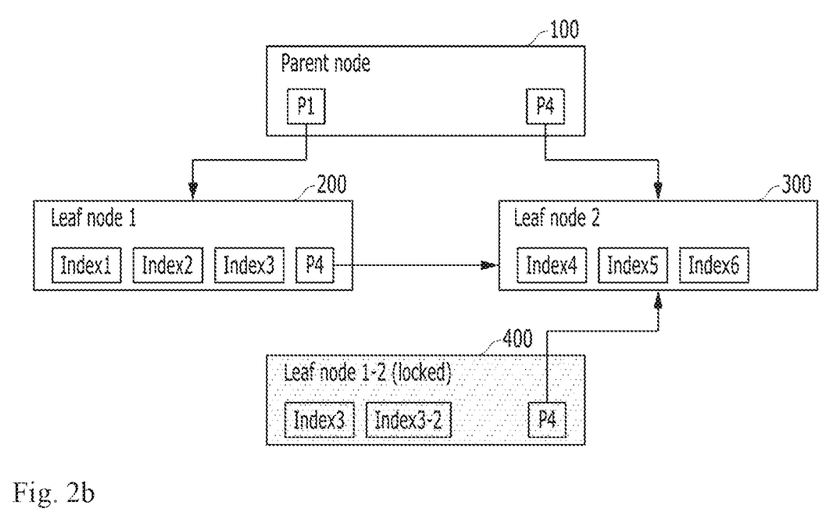

FIG. 29 is an exemplary diagram illustrating the configuration of the tree index when the split of the node starts.

According to the exemplary embodiment of the present disclosure, the processor 10 may decide the split of the first leaf node. An example after FIG. 2B illustrates an example in which data is added to the index 3 and the index 3 is thus split. In the case where the index needs to be added by addition of the data, when a spare space of the first leaf node 200 is deficient, the processor may decide that the first leaf node 200 is split. The processor 10 may generate a 1-2nd leaf node 400 which is a next node of the first leaf node 200.

The 1-2" leaf node 400 may include an added index 3-2 and the pointer 4. The 1-2$^{nd}$ leaf node 400 may include at least some duplicated indexes and pointers among the indexes and the pointers of the first leaf node 200. The processor may store in the 1-2$^{nd}$ leaf node 400 an index to be split among the indexes stored in the first leaf node 200. The processor may store in the 1-2$^{nd}$ leaf node the index (index 3 and index 3-2 in the example of the drawing) to be split among the indexes stored in the first leaf node 200. The index to be split in the first leaf node 200 may be an index which needs to be adjacent to the added index 3-2. The processor 10 may link the 1-2$^{nd}$ leaf node 400 and the second leaf node to the pointer. The processor 10 may search the 1-2$^{nd}$ leaf node 400 and thereafter, search the second leaf node by the 1-2$^{nd}$ leaf node 400 linked to the pointer.

According to the exemplary embodiment of the present disclosure, in this case, since the processor needs to modify the 1-2$^{nd}$ leaf node 400, the processor may set a lock in the 1-2$^{nd}$ leaf node 400. It may be impossible to search the 1-2$^{nd}$ leaf node in which the lock is set by the traverse. However, since the first leaf node substantially links the second leaf node to the pointer, the 1-2$^{nd}$ leaf node need not be searched in the traverse to prevent performance from being deteriorated due to the lock. The processor 10 may add the pointer of the second leaf node to the 1-2$^{nd}$ leaf node while the lock is set in the 1-2$^{nd}$ leaf node 400. The pointer of the 1-2$^{nd}$ leaf node may be the same as the pointer P4 which exists in the first leaf node. The pointer of the 1-2$^{nd}$ leaf node may be the pointer linked to the second leaf node in the 1-2$^{nd}$ leaf node. The processor 10 may release the lock of the 1-2$^{nd}$ leaf node. The lock may be a spin lock.

According to FIG. 2B, when the processor 10 is traversed from the parent node 100, the processor 10 may search the first leaf node 200 along the pointer P1. Further, when the processor 10 searches the first leaf node 200, the processor 10 may search the second leaf node 300 along the pointer P4. Therefore, the processor 10 may access all of the indexes 1 to 6. Further, the processor may search the second leaf node through the pointer P4 of the parent node 100. However, the processor 10 may not search the leaf node 1-2 in which the data is changed as the lock is set. Further, when the node is split according to FIG. 2B, the processor 10 may not search the changed 1-2$^{nd}$ leaf node 400. Since the pointer linked with another node does not exist in the 1-2$^{nd}$ leaf node 400, the processor 10 may not access the 1-2$^{nd}$ leaf node 400. The 1-2$^{nd}$ leaf node 400 which is being changed is not searched to shorten the indexing time in the tree index data structure. Further, since the pointer linked to the 1-2$^{nd}$ leaf node 400 does not exist even during the split, the indexing may be continuously performed. Therefore, since waiting for the traverse due to the lock may be minimized, the performance deterioration may be minimized.

Figure 2C:
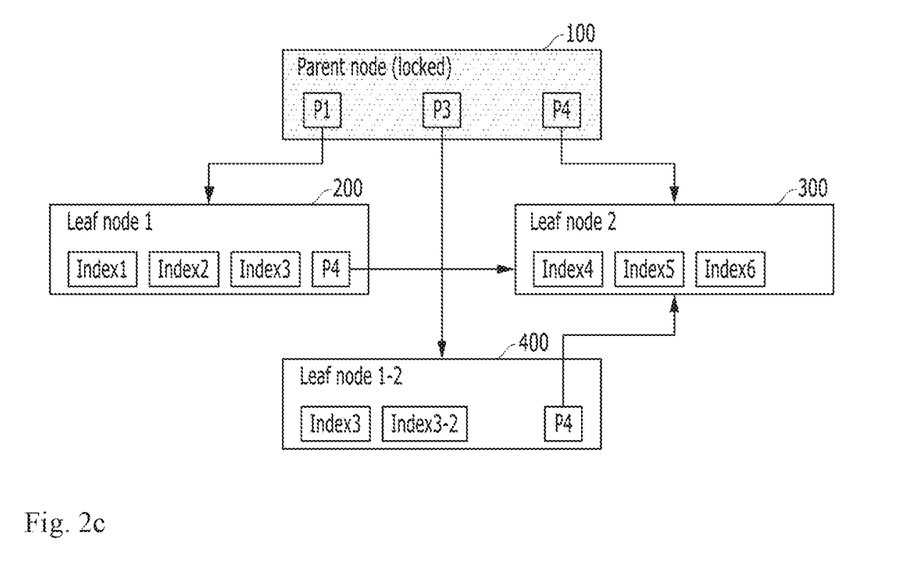

FIG. 2C is an exemplary diagram illustrating the configuration of the tree index during the node split process.

According to the exemplary embodiment of the present disclosure, the processor 10 may link the parent node 100 and the 1-2$^{nd}$ leaf node 400 to the pointer. In this case, the processor 10 may set the lock in the parent node 100. The processor 10 may not search the parent node 100 in which the lock is set at the time of performing the traverse. The processor 10 may add the pointer of the 1-2$^{nd}$ leaf node to the parent node. The pointer of the 1-2$^{nd}$ leaf node may be the pointer P3. The pointer P3 may be positioned between the pointer P1 and the pointer P4 in the parent node according to the order of the leaf nodes indicated by the respective pointers. The pointer of the 1-2$^{nd}$ leaf node may be the pointer linked to the 1-2$^{nd}$ leaf node 400 from the parent node 100. The processor 10 may release the lock set in the parent node 100.

According to FIG. 2C, when the processor 10 is traversed from the parent node 100, the lock is set in the parent node 100, and as a result, the search of the parent node may be restricted. Therefore, the processor 10 which may not search the parent node 100 may not access the first leaf node, the 1-2$^{nd}$ leaf node, and the second leaf node. When the lock is set in the parent node 100, the processor may continuously reattempt searching the parent node 100 and return to the search of a higher node—the higher node may be a node having the small depth before the parent node 100.

Figure 2D:
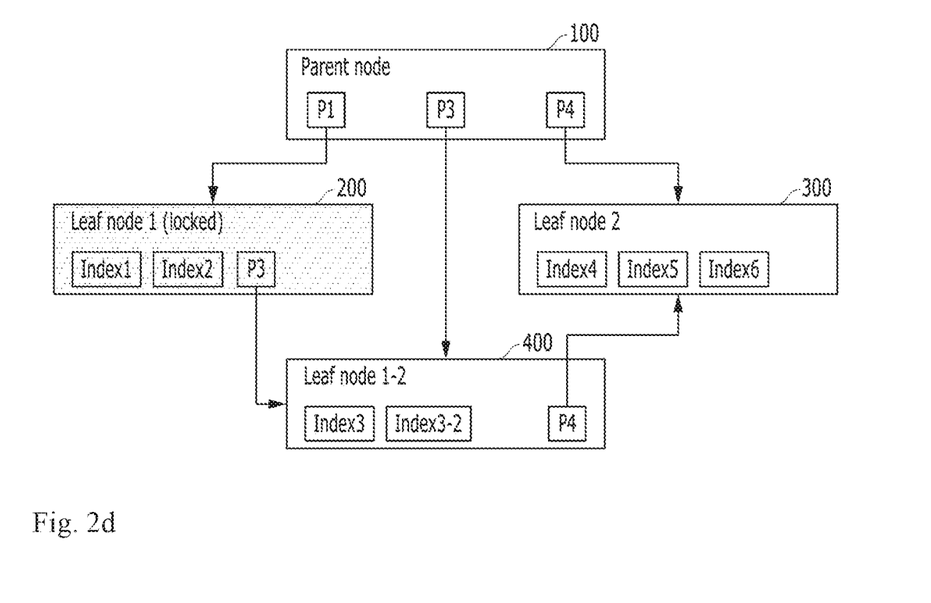

FIG. 2D is an exemplary diagram illustrating the configuration of the tree index during the node split process.

According to the exemplary embodiment of the present disclosure, the processor 10 may link the leaf node 200 and the 1-2$^{nd}$ leaf node to the pointer. The processor 10 may set the lock in the 1 leaf node. A time when the processor 10 sets the lock in the first leaf node may be the same as or prior to a time when the lock of the parent node 100 is released. The lock is set in the first leaf node 200 before the lock of the parent node 100 is released, and as a result, when the lock of the parent node 100 is released and the traverse thus completes the search, it may be restricted that the traverse accesses the first leaf node 200.

According to the exemplary embodiment of the present disclosure, the processor 10 may delete the pointer P4 from the first leaf node 200 when the lock is set in the first leaf node 200. The processor 10 deletes the pointer P4, and as a result, there may be no link of the first leaf node 200 and the second leaf node. When the lock is set in the first leaf node 200, the processor 10 may delete the indexes which exist in the 1-2$^{nd}$ leaf node 400 from the first leaf node. The processor 10 may delete from the first leaf node 200 an index (the index 3 in the illustration of the drawing) duplicated from the first leaf node 200 to the 1-2$^{nd}$ leaf node 400. When the lock is set in the first leaf node 200, the processor 10 may delete the index 3 from the first leaf node 200. The index 3 is duplicated to exist in the 1-2$^{nd}$ leaf node 400.

According to the exemplary embodiment of the present disclosure, the processor 10 may add the pointer toward the 1-2$^{nd}$ leaf node to the first leaf node 200. The pointer of the 1-2$^{nd}$ leaf node may be the pointer P3. The position of the pointer of the 1-2$^{nd}$ leaf node may be the same as the position of the pointer P4 deleted from the first leaf node 200 and the same as the position of the deleted index 3. The pointer of the 1-2$^{nd}$ leaf node may be the pointer that links the 1-2$^{nd}$ leaf node in the first leaf node. When the processor 10 completes the search of the first leaf node 200, the processor 10 may search the 1-2$^{nd}$ leaf node 400 which is the node linked through the pointer P3. The nodes may be searched in order by the pointer P3 and the index 1, the index 2, the index 3, and the index 3-2 may also be arranged in order.

In FIG. 2D, when the processor 10 is traversed from the parent node 100, the access to the leaf node 1 in which the lock is set may be restricted. Therefore, the processor 10 may not search the index 1 and the index 2 through the pointer P1 which exists in the parent node 100. However, the processor 10 may search the 1-2$^{nd}$ leaf node 400 in the parent node 100 through the pointer P3. Therefore, the processor 10 may access the index 3 and the index 3-2. The processor 10 may search the second leaf node 300 in the parent node 100 through the pointer P4. Therefore, the processor 10 may access the index 4, the index 5, and the index 6. Further, the processor 10 may search the 1-2$^{nd}$ leaf node and thereafter, the second leaf node through the pointer P4. In addition, when the node is split according to FIG. 2D, the processor 10 may not access the first leaf node 200 in which the lock is set. However, the processor 10 may access the leaf node 1-2 through the pointer P3 in the parent node. Therefore, a split technique according to the exemplary embodiment of the present disclosure may reduce a delay of the traverse due to the split and the lock by reducing the number of indexes which the traverse is impossible to access to enhance the performance the entire system as compared with the related art that needs to set the lock in both the parent node and the leaf node.

Figure 2E:
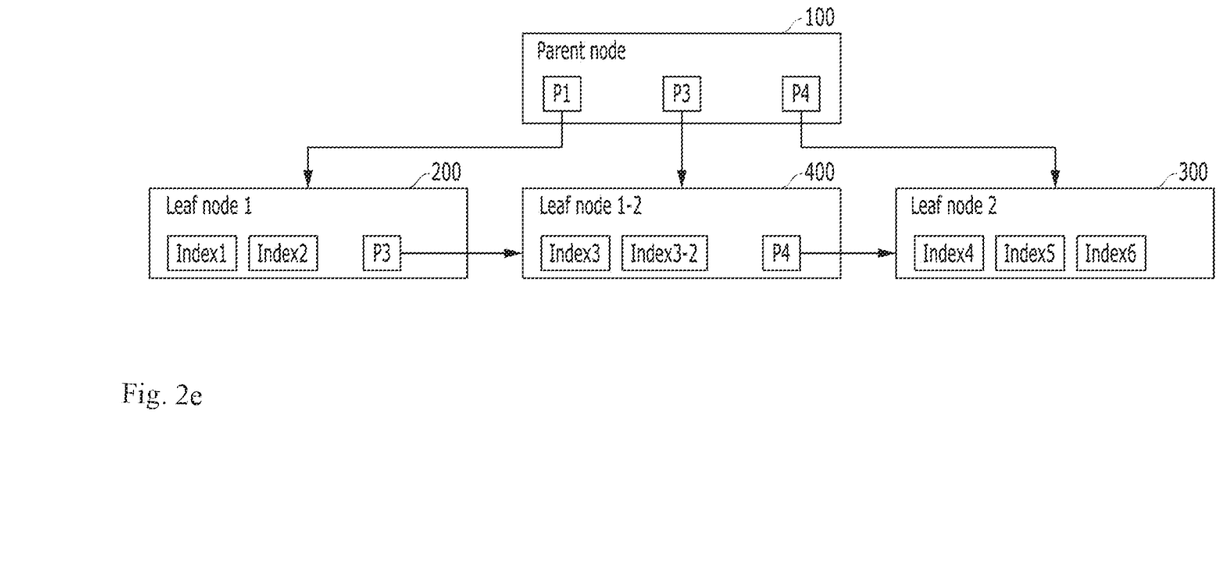

FIG. 2E is an exemplary diagram illustrating the configuration of the tree index in which the node split is completed.

The parent node 100 may include the pointer P1 linked to the first leaf node 200, the pointer P3 linked to the 1-2$^{nd}$ leaf node 400, and the pointer P4 linked to the second leaf node. The first leaf node 200 may include the index 1, the index 2, and the pointer P3. The 1-2$^{nd}$ leaf node 400 may include the index 3, the index 3-2, and the pointer P4. The second leaf node 300 may include the index 4, the index 5, and the index 6. When the processor 10 traverses the tree index data structure according to FIG. 2E, the processor 10 may search the first leaf node 200 through the pointer P1 in the parent node. Thereafter, the processor 10 may search the 1-2$^{nd}$ leaf node 400 through the pointer P3 of the first leaf node. Then, the processor 10 may search the second leaf node 300 through the pointer P4 of the 1-2$^{nd}$ leaf node. The processor 10 may traverse the parent node 100, the first leaf node, the 1-2$^{nd}$ leaf node, and the second leaf node in order. Therefore, the indexes 1 to 3, the index 3-2, and the indexes 4 to 6 may be arranged in sequence.

The node, the pointer, and the index mentioned in FIGS. 2A to 2E are just an example and the present disclosure is not limited thereto. In the present disclosure, the case where the first leaf node 200 is split is described as an example, but another lead node may be split. According to the disclosed steps, multiple nodes may be split. The parent node may be the leaf node of another node, and as a result, a node at a higher step may exist, which has the smaller depth than the parent node. Further, the leaf node may be the parent node of another node, and as a result, a node at a lower step may exist, which has the larger depth than the leaf node.

According to the exemplary embodiment of the present disclosure, the respective steps or commands of FIGS. 2A to 2E are performed in order to allow the first leaf node to be split. According to the exemplary embodiment of the present disclosure, the node split process may be performed in an order of a step of generating the 1-2$^{nd}$ leaf node, a step of linking the 1-2$^{nd}$ leaf node and the second leaf node to the pointer, a step of linking the parent node and the 1-2$^{nd}$ leaf node to the pointer, and a step of linking the first leaf node and 1-2$^{nd}$ leaf node to the pointer. The node is split according to such an order to set the lock only in one node for each step and change the node without interfering traversing in another process even during the splitting process. Further, since the lock is set in one node for each step, a dead lock does not occur, and as a result, the present disclosure may provide the tree index structure which may be effectively indexed.

According to the exemplary embodiment of the present disclosure, the lock which the processor sets in the node may be the spin lock. When the processor 10 intends to access the node in which the spin lock is set, the search of the node may be restricted by the set lock. The processor 10 may continuously attempt to search the node in which the spin lock is set. The processor 10 may attempt the search until the spin lock is released and the node may be thus searched.

When the processor 10 performs the traverse, the processor 10 may search the first leaf node 200 and the second leaf node linked to the parent node through the pointer. The processor 10 may verify whether the lock is set in the searched first leaf node or second leaf node. When the lock is not set in the verified node, the processor 10 may continuously perform the traverse. Further, when the lock is set in the verified node, the traverse may be performed in the parent node again. When the lock is set in the verified node, the traverse may be performed again by immediately returning to the higher node or a highest node.

According to the exemplary embodiment of the present disclosure, at least one of the parent node 100, the first leaf node 200, the second leaf node, and the 1-2$^{nd}$ leaf node 400 may include a time stamp representing a time when each node is modified. Further, when the lock is set in each node, the time when the lock is set may be recorded in the time stamp. When the processor 10 traverses the tree index data structure, the processor 10 compares the time stamp value of the node and the traverse time stamp value to determine whether to access the node or return to the previous node. The traverse time stamp value may be the time stamp value when performing the traverse starts.

According to the exemplary embodiment of the present disclosure, when the processor 10 performs the traverse, the processor 10 may search the first leaf node and the second leaf node linked to the parent node through the pointer. The processor 10 may verify the time stamp of the first leaf node or the second leaf node. The time stamp may include a value or a time value by a counter which increases monotonically. The processor 10 may continuously perform the traverse when the verified time stamp value of the node is less than the time stamp value thereof. The processor 10 may perform the traverse in the parent node again when the verified time stamp value of the node is equal to or more than the time stamp value thereof. The predetermined value may be the traverse time stamp value.

According to the exemplary embodiment of the present disclosure, each of the parent node 100, the first leaf node 200, the second leaf node, and the 1-2$^{nd}$ leaf node 400 may include one or more indexes and the respective indexes may be consecutively disposed in the respective nodes and the processor 10 may consecutively index the data. In the present disclosure, when the traverse is performed in each step, the indexes of the nodes in which the traverse is possible may be consecutively disposed except for the node in which the lock is set. Further, only one lock may be set in each step and the processor may search the indexes of the nodes in which the lock is not set.

According to the exemplary embodiment of the present disclosure, the parent node, the first leaf node, the second leaf node, and the 1-2$^{nd}$ leaf node may be positioned in a main memory. Further, the parent node, the first leaf node, the second leaf node, and the 1-2$^{nd}$ leaf node have the same size and when the node is modified, the node may be modified in an atomic operation scheme. That is, the processor 10 may perform read, modify, and write assembly language commands of reading data in the memory, modifying the read data, and moving the modified value to the memory again one by one. Further, each node may have the size of 8 kbits, but the size of each node is not limited thereto.

Figure 3:
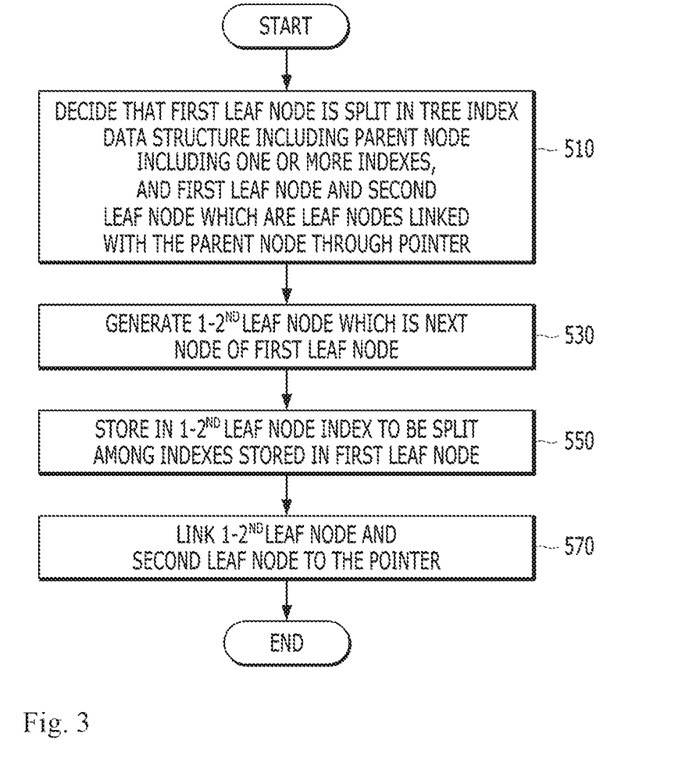
FIG. 3 is a flowchart illustrating an indexing method according to an exemplary embodiment of the present disclosure.

FIG. 3 is a flowchart illustrating an indexing method according to an exemplary embodiment of the present disclosure.

According to the exemplary embodiment of the present disclosure, in the tree index data structure including the first leaf node and the second leaf node which are the leaf nodes linked with the parent node including one or more indexes through the pointer, the processor 10 may determine splitting the first leaf node. In the case where the index is added to the first leaf node, when an empty space is deficient in the node, the processor 10 may determine that the first leaf node will be split (510).

The processor 10 may generate the $1\text{-}2^{nd}$ leaf node 400 which is the next node of the first leaf node 200 (530). The $1\text{-}2^{nd}$ leaf node 400 may have the same size as the first leaf node and may be a node to be searched after the first leaf node.

The processor 10 may store in the $1\text{-}2^{nd}$ leaf node an index to be split among the indexes stored in the first leaf node (550). At least some data of the first leaf node 200 are duplicated to be stored in the $1\text{-}2^{nd}$ leaf node 400. In this case, an index adjacent to a newly generated index may be duplicated.

The processor 10 may link the $1\text{-}2^{nd}$ leaf node and the second leaf node to the pointer (570). The pointer may exist in the $1\text{-}2^{nd}$ leaf node and link the $1\text{-}2^{nd}$ leaf node to the second leaf node. The processor 10 may search the second leaf node after the $1\text{-}2^{nd}$ leaf node by using the pointer.

According to the exemplary embodiment of the present disclosure, when the node is split in the tree index data structure, the node may be split while only one lock is set. According to the present disclosure, when the node is split in the tree index structure, the lock may be set in only one node at the same time. In the related art, the lock is set in both the parent node and the leaf node, and as a result, two or more locks need to be set. However, according to the present disclosure, when only one lock is set, the dead lock may be reduced as compared with the tree index structure in which two or more locks are set in the related art. When the only one lock is set, situations such as switching to waiting at the time of performing the traverse or performing the traverse again occur less than the case where two or more locks are set. The number of locks decreases, and as a result, a probability that the traverse will attempt to search the node in which the lock is set decreases and rapid traverse is enabled to increase the efficiency of the indexing. Further, in the tree index data structure, the index may be searched through the traverse even while the split is performed. According to the exemplary embodiment of the present disclosure, only one lock is set and the lock may be set in a lower node than the tree index data structure in the related art. The residual index other than the index which belongs to the node in which the lock is set may be traversed. When the tree index data structure is traversed, the nodes in which the lock is not set may be searched according to each step and the nodes may be searched while the order of the index is not changed. Further, the indexes in which the split is completed are continuously arranged to be disposed in the index number order. According to the exemplary embodiment of the present disclosure, the indexes may be physically arranged in the memory and the indexing time may be shortened by rapidly accessing data.

Figure 4:
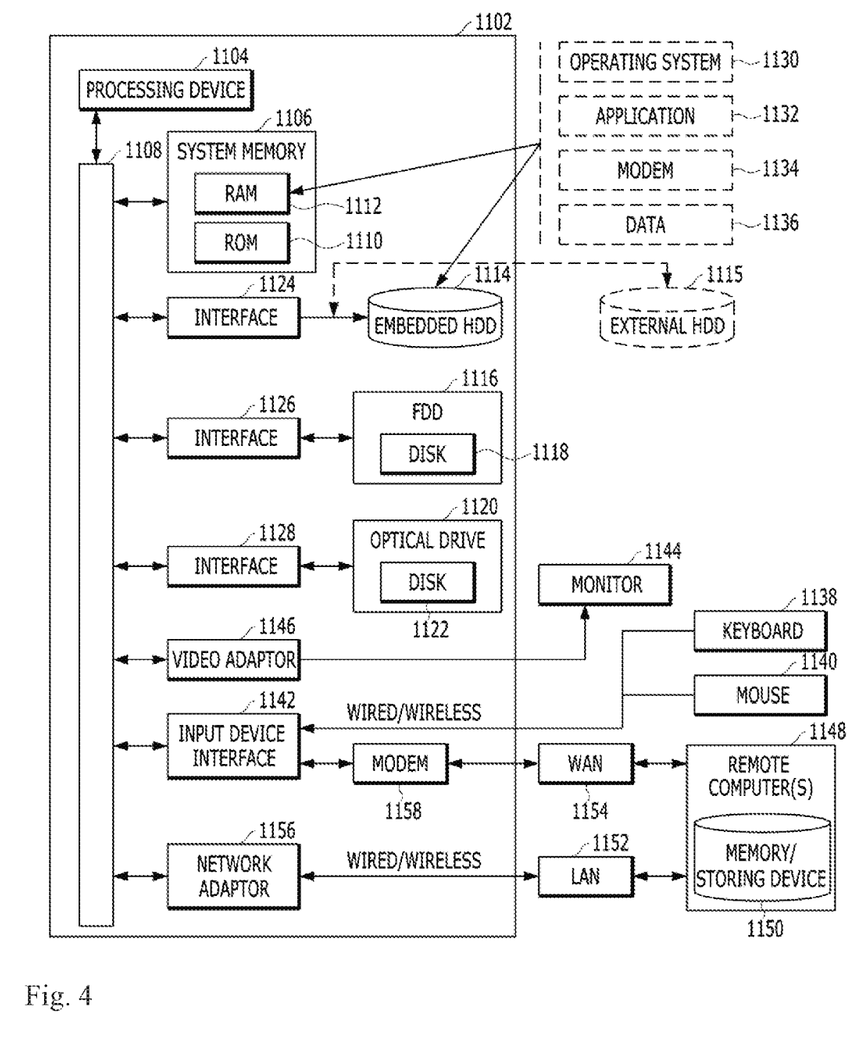
FIG. 4 is a block diagram of a computer device according to an exemplary embodiment of the present disclosure.

FIG. 4 is a block diagram of a computing device according to an exemplary embodiment of the present disclosure.

FIG. 4 illustrates a schematic and general schematic view of an exemplary computing environment in which the exemplary embodiments of the present disclosure may be implemented.

The present disclosure has generally been described above in association with a computer executable command which may be executed on one or more computers, but it will be well appreciated by those skilled in the art that the present disclosure can be implemented through a combination with other program modules and/or a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computer device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As not a limit but an example, the computer readable media may include both computer readable storage media and computer readable transmission media. The computer readable storage media include volatile and non-volatile, temporary or non-temporary, movable and non-movable media implemented by a predetermined method or technology for storing information such as a computer readable command, a data structure, a program module, or other data. The computer storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a carrier wave or a modulated data signal such as other Tampon mechanism and include all information transfer media. The term modulated data signal means a signal acquired by configuring or changing at least one of characteristics of the signal so as to encode information in the signal. As not a limit but an example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor or other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an embedded hard disk drive (HDD) 1114 (for example, EIDE and SATA)—the embedded hard disk drive (HDD) 1114 may also be configured for an exterior purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable command, and others. In the case of the computer 1102, the drives and the media correspond to storing predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached by the RAM 1112. It will be well appreciated that the present disclosure may be implemented in various operating systems which are commercially usable or a combination of the operating systems.

A user may input commands and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. The devices and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes a speaker, a printer other peripheral output devices (not illustrated).

The computer 1102 may operate in a networked environment by using a logical connection to one or more remote computers including remote computer(s) 1148 through wired and/or wireless communication. The remote computer(s) 1148 may be a workstation, a computer device computer, a router, a personal computer, a portable computer, a microprocessor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and the like and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication in the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computer device on the WAN 1154 or connection through the Internet. The modem 1158 which may be an embedded or exterior and wired or wireless device is connected to the system bus 1108 through the serial port interface 1142. In the networked environment, the program modules described with respect to the computer 1102 or some thereof may be stored in the remote memory/storage device 1150. The illustrated network connection is exemplary and it will be well appreciated that other means configuring a communication link among computers may be used.

The computer 1102 performs an operation of communicating with predetermined wireless devices or entities which are disposed and operated by the wireless communication, for example, the printer, a scanner, a desktop and/or portable computer, a portable data assistant (PDA), a communication satellite, predetermined equipment or place associated with a wireless detectable tag, and a telephone. This at least includes Wi-Fi and a Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11 (a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art, that information d signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as "software"), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be analyzed that the implementation determination departs from the scope of the present disclosure.

Various exemplary embodiments presented herein may be implemented as manufactured articles using a method, an apparatus, or a standard programming and/or engineering technique. The term "manufactured article" includes a computer program, a carrier, or a medium which is accessible by a predetermined computer-readable device. For example, a computer-readable medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but it does not mean that the method claims are limited to the presented specific order or hierarchical structure.

The description of the presented exemplary embodiments is provided so that those skilled in predetermined art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the embodiments presented herein, but should be analyzed within the widest range which is consistent with the principles and new features presented herein.

What is claimed is:

1. A non-transitory computer readable storage medium storing a computer program and including encoded commands, wherein when the computer program is executed by one or more processors of a computer system, which allows the one or more processor to perform the following process for indexing, the process comprising:
    deciding that a first leaf node is split in a tree index data structure including a parent node including one or more indexes, and that the first leaf node is linked with the parent node through a pointer which is linked to the first leaf node and which is included in the parent node and a second leaf node is linked with the parent node through a pointer which is linked to the second leaf node and which is included in the parent node;
    generating a 1-2nd leaf node which is a next node of the first leaf node;
    setting a lock in the 1-2nd leaf node, without setting a lock in other nodes;
    storing in the 1-2nd leaf node an index to be split among indexes stored in the first leaf node;
    adding the pointer which is linked to the second leaf node and which is included in the 1-2nd leaf node to the 1-2nd leaf node;
    releasing the lock of the 1-2nd leaf node;
    setting a lock in the parent node, without setting a lock in other nodes;
    adding the pointer which is linked to the 1-2nd leaf node and which is included in the parent node to the parent node;
    releasing the lock of the parent node;
    setting a lock in the first leaf node, without setting a lock in other nodes;
    deleting a duplicate index of the 1-2nd leaf node from the first leaf node;
    adding the pointer which is linked to the 1-2nd leaf node and which is included in the first leaf node to the first leaf node; and
    releasing the lock of the first leaf node.

2. The non-transitory computer readable storage medium of claim 1, wherein at least one of the parent node, the first leaf node, the second leaf node, and the 1-2nd leaf node includes a time stamp representing a time when each node is modified.

3. The non-transitory computer readable storage medium of claim 2, wherein the process further comprises:
    searching the first leaf node linked to the parent node through the pointer which is linked to the first leaf node and which is included in the parent node and the second leaf node linked to the parent node through the pointer having an address for the second leaf node at the time of performing a traverse;
    verifying the time stamp of the searched first leaf node or the searched second leaf node; and
    when a value of the verified time stamp is less than a predetermined value, continuously performing the traverse; or when the value of the verified time stamp is equal to or more than the predetermined value, performing the traverse in the parent node again.

4. The non-transitory computer readable storage medium of claim 1, wherein each of the parent node, the first leaf node, the second leaf node, and the 1-2nd leaf node includes one or more indexes, and the respective indexes are consecutively disposed in the respective nodes and index consecutive data.

5. The non-transitory computer readable storage medium of claim 1, wherein the parent node, the first leaf node, the second leaf node, and the 1-2nd leaf node are positioned in a main memory and have the same size, and when at least one of the parent node, the first leaf node, the second leaf node, and the 1-2nd leaf node is modified, the at least one of the parent node, the first leaf node, the second leaf node, and the 1-2nd leaf node is modified in an atomic operation scheme.

6. The non-transitory computer readable storage medium of claim 1, wherein the process further comprises:
 searching the first leaf node linked to the parent node through the pointer which is linked to the first leaf node and which is included in the parent node and the second leaf node linked to the parent node through the pointer which is linked to the second leaf node and which is included in the parent node at the time of performing a traverse;
 verifying whether a lock is set in the searched first leaf node or the searched second leaf node; and
 when the lock is not set in the searched first leaf node or the searched second leaf node, continuously performing the traverse; or when the lock is set in the searched first node or the searched second leaf node, waiting for the performing of the traverse until the lock is released or performing the traverse in a root node or the parent node again.

7. A method for indexing performed by one or more processors of a computer device, the method comprising:
 deciding that a first leaf node is split in a tree index data structure including a parent node including one or more indexes, and that the first leaf node is linked with the parent node through a pointer which is linked to the first leaf node and which is included in the parent node and a second leaf node is linked with the parent node through a pointer which is linked to the second leaf node and which is included in the parent node;
 generating a 1-2nd leaf node which is a next node of the first leaf node;
 setting a lock in the 1-2nd leaf node, without setting a lock in other nodes;
 storing in the 1-2nd leaf node an index to be split among indexes stored in the first leaf node;
 adding the pointer which is linked to the second leaf node and which is included in the 1-2nd leaf node to the 1-2nd leaf node;
 releasing the lock of the 1-2nd leaf node;
 setting a lock in the parent node, without setting a lock in other nodes;
 adding the pointer which is linked to the 1-2nd leaf node and which is included in the parent node to the parent node;
 releasing the lock of the parent node;
 setting a lock in the first leaf node, without setting a lock in other nodes;
 deleting a duplicate index of the 1-2nd leaf node from the first leaf node;
 adding the pointer which is linked to the 1-2nd leaf node and which is included in the first leaf node to the first leaf node; and
 releasing the lock of the first leaf node.

8. A computer device for indexing, the computer device comprising:
 one or more processors; and
 a memory storing commands executable in the one or more processors, wherein the one or more processors are configured to:
 decide that a first leaf node is split in a tree index data structure including a parent node including one or more indexes, and that the first leaf node is linked with the parent node through a pointer which is linked to the first leaf node and which is included in the parent node and a second leaf node is linked with the parent node through a pointer which is linked to the second leaf node and which is included in the parent node;
 generate a 1-2nd leaf node which is a next node of the first leaf node;
 set a lock in the 1-2nd leaf node, without setting a lock in other nodes;
 store in the 1-2nd leaf node an index to be split among indexes stored in the first leaf node;
 add the pointer which is linked to the second leaf node and which is included in the 1-2nd leaf node to the 1-2nd leaf node;
 release the lock of the 1-2nd leaf node;
 set a lock in the parent node, without setting a lock in other nodes;
 add the pointer which is linked to the 1-2nd leaf node and which is included in the parent node to the parent node;
 release the lock of the parent node;
 set a lock in the first leaf node, without setting a lock in other nodes;
 delete a duplicate index of the 1-2nd leaf node from the first leaf node;
 add the pointer which is linked to the 1-2nd leaf node and which is included in the first leaf node to the first leaf node; and
 release the lock of the first leaf node.

* * * * *